US 8,250,061 B2

(12) United States Patent
Sun et al.

(10) Patent No.: US 8,250,061 B2
(45) Date of Patent: Aug. 21, 2012

(54) LEARNING RETRIEVAL FUNCTIONS INCORPORATING QUERY DIFFERENTIATION FOR INFORMATION RETRIEVAL

(75) Inventors: Gordon Sun, Redwood Shores, CA (US); Zhaohui Zheng, Mountain View, CA (US); Hongyuan Zha, State College, PA (US)

(73) Assignee: Yahoo! Inc., Sunnyvale, CA (US)

( * ) Notice: Subject to any disclaimer, the term of this patent is extended or adjusted under 35 U.S.C. 154(b) by 1336 days.

(21) Appl. No.: 11/343,910

(22) Filed: Jan. 30, 2006

(65) Prior Publication Data

US 2007/0179949 A1     Aug. 2, 2007

(51) Int. Cl.
*G06F 7/00* (2006.01)
*G06F 17/30* (2006.01)

(52) U.S. Cl. .. 707/713; 707/728; 707/748; 707/999.003

(58) Field of Classification Search .................. 707/3, 5, 707/101; 715/236; 706/12, 15–16
See application file for complete search history.

(56) References Cited

U.S. PATENT DOCUMENTS

| | | | |
|---|---|---|---|
| 6,978,267 B2 * | 12/2005 | Perisic et al. | 707/5 |
| 7,065,708 B2 * | 6/2006 | Ono et al. | 715/236 |
| 7,124,129 B2 * | 10/2006 | Bowman et al. | 707/5 |
| 2004/0215606 A1 * | 10/2004 | Cossock | 707/3 |
| 2005/0080772 A1 * | 4/2005 | Bem | 707/3 |
| 2005/0216426 A1 * | 9/2005 | Weston et al. | 706/12 |
| 2005/0234904 A1 * | 10/2005 | Brill et al. | 707/5 |
| 2007/0094171 A1 * | 4/2007 | Burges et al. | 706/16 |
| 2007/0136336 A1 * | 6/2007 | Shanahan et al. | 707/101 |
| 2007/0156615 A1 * | 7/2007 | Davar et al. | 706/15 |

* cited by examiner

*Primary Examiner* — Robert Timblin
*Assistant Examiner* — Jessica N Le
(74) *Attorney, Agent, or Firm* — Seth H. Ostrow; Ostrow Kaufman LLP

(57) ABSTRACT

The system and method of the present invention allows for the determination of the relevance of a content item to a query through the use of a machine learned relevance function that incorporate query differentiation. A method for selecting a relevance function to determine a relevance of a query-content item pair comprises generating a training set comprising one or more content item-query pairs. Content item-query pairs in the training set are collectively used to determine the relevance function by minimizing a loss function according to a relevance score adjustment function that accounts for query differentiation. The monotocity of relevance score adjustment function allows the trained relevance function to be directly applied to new queries.

19 Claims, 3 Drawing Sheets

LEARNING RETRIEVAL FUNCTIONS INCORPORATING QUERY DIFFERENTIATION FOR INFORMATION RETRIEVAL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

This application is related to commonly owned patent application Ser. No. 10/424,170, filed on Apr. 25, 2003 and titled "METHOD AND APPARATUS FOR MACHINE LEARNING A DOCUMENT RELEVANCE FUNCTION,", which is hereby incorporated by reference herein in its entirety.

FIELD OF THE INVENTION

The invention disclosed herein relates generally to information retrieval. More specifically, the invention relates to the determination of learning retrieval functions that incorporate query differentiation to determine the relevance of one or more content items that are responsive to a query.

BACKGROUND OF THE INVENTION

The Internet, which allows access to billions of content items stored on host computers around the world, represents a particularly diverse and large collection of content items. Development of a search engine that can such index a large and diverse collection of content items, yet provide the user a short, relevant result set of content items in response to a query has long been recognized as a problem in information retrieval. For example, a user of a search engine typically supplies a query to the search engine that contains only a few terms and expects the search engine to return a result set comprising relevant content items. Although a search engine may return a result set comprising tens, hundreds, or more content items, most users are likely to only view the top several content items in the result set. Thus, to be useful to a user, a search engine should determine those content items in a given result set that are most relevant to the user, or that the user would be most interested in, on the basis of the query that the user submits.

A user's perception of the relevance of a content item to a query is influenced by a number of factors, many of which are highly subjective. These factors are generally difficult to capture in an algorithmic set of rules that define a relevance function. Furthermore, these subjective factors may change over time, as for example when current events are associated with a particular query term. As another example, changes over time in the aggregate content of the content items available through the Internet may also alter a user's perception of the relative relevance of a given content item to a given query. Users who receive search result sets that contain results not perceived to be highly relevant become frustrated and potentially abandon the use of the search engine. Designing effective and efficient retrieval functions is therefore of high importance to information retrieval In the past, search engine designers have attempted to construct relevance functions that take a query and a content item as a set of inputs and return a relevance value, which indicates the relevance of the content item to the query. The relevance value may be used, for example, to order by relevance a set of content items that are responsive to a given query. For the ordering to be useful, however, the underlying relevance function should accurately and quickly determine the relevance of a given content item to a given query. Many retrieval models and methods are known to those of skill in the art, including vector space models, probabilistic models and language modeling methods, with varying degrees of success.

According to another technique, referred to as a "feature oriented" method for probabilistic indexing and retrieval, features of query-content item pairs are extracted and regression methods and decision trees are used for learning relevance functions. The sample space for feature-oriented methods is the collection of the feature vectors in the corpus of content items, which is adequate in traditional information retrieval systems where retrieval functions are usually designed to work for small or homogeneous text corpora. For more diverse corpora such as the world wide web (which introduces a substantial number of non-textual features), it is possible that similar feature vectors are labeled differently in terms of a relevance assessment, as well as very different feature vectors being labeled similarly in terms of a relevance assessment.

Thus, systems and methods are needed that incorporate query differentiation to disambiguate feature vectors within the framework of feature-oriented methods.

BRIEF SUMMARY OF THE INVENTION

The present invention is directed towards systems and methods for improving the selection of a relevance function through the use of query differentiation training. A relevance function trained with query differentiation allows an information retrieval system, such as an Internet or intranet search engine, to determine the relevant of a content item to a query. According to one embodiment, the present invention is directed towards a method for selecting a relevance function to determine a relevance of one or more query-content item pairs. The method comprises generating a training set comprising one or more content item-query pairs. For each query-content item pair, a relevance function is determined and a loss function used to modify the relevance function according to a relevance score adjustment function. The relevance score adjustment function accounts for query differentiation in the selection of a relevance function. A relevance function trained with query differentiation is selected that produces the smallest loss.

The loss function may be used to modify the relevance function in a number of ways. According to one embodiment, using the loss function comprises modifying the relevance function according to a linear relevance score adjustment function. Alternatively, using the loss function may comprise modifying the relevance function according to a non-linear relevance score adjustment function. According to other embodiments, using the loss function comprises using a loss function selected from a set of loss functions consisting of a least mean square loss function, a query pairwise loss function and a loss function that compares a desired ranking order with an output ranking order. The loss function may also utilize query descent to select the relevance function trained with query differentiation. Additionally, one or more regularization parameters may be utilized to control parameters of the relevance score adjustment function.

A training set is used as an input to the loss function. Generating the training set may comprise selecting a relevance score for one or more query-content item pairs in the training set. Training set generation may also include selecting query dependent features for a given query-content item pair, as well as query independent features for a given query-content item pair. The training set also comprises one or more training relevance scores for the one or more query-content item pairs in the training set. Generating a training set may comprise providing a given query-content item pair to a human judge to determine training a relevance score. Alternatively, or in conjunction with the foregoing, generating a training set may also comprise generating a training relevance score on the basis of historical clickthrough data for a given query-content item pair. According to other embodiments, generating a training relevance score for a given query-content item pair may be based on information collected from web clickthrough data, bookmark data, user input data using a client application (e.g., browser), etc.

The method for selecting a relevance function may comprise storing the relevance function trained with query differentiation for application to a new query-content item pair. The relevance function trained with query differentiation is retrieved for application to a new content item in response to receipt of a query from a user, the relevance function determining the relevance of the content item to the query.

The method for selecting a relevance function may also comprise retrieving one or more content items in a result set in response to receipt of the query from the user and for a given content item in the result set, determining a feature vector for the given content item. The relevance function trained with query differentiation is applied to the feature vector for the given content item to generate a relevance score for the given content item. Ordering of the result set may be according to one or more relevance scores of the one or more content items in the result set, which may be transmitted to the user.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

Figure 1:
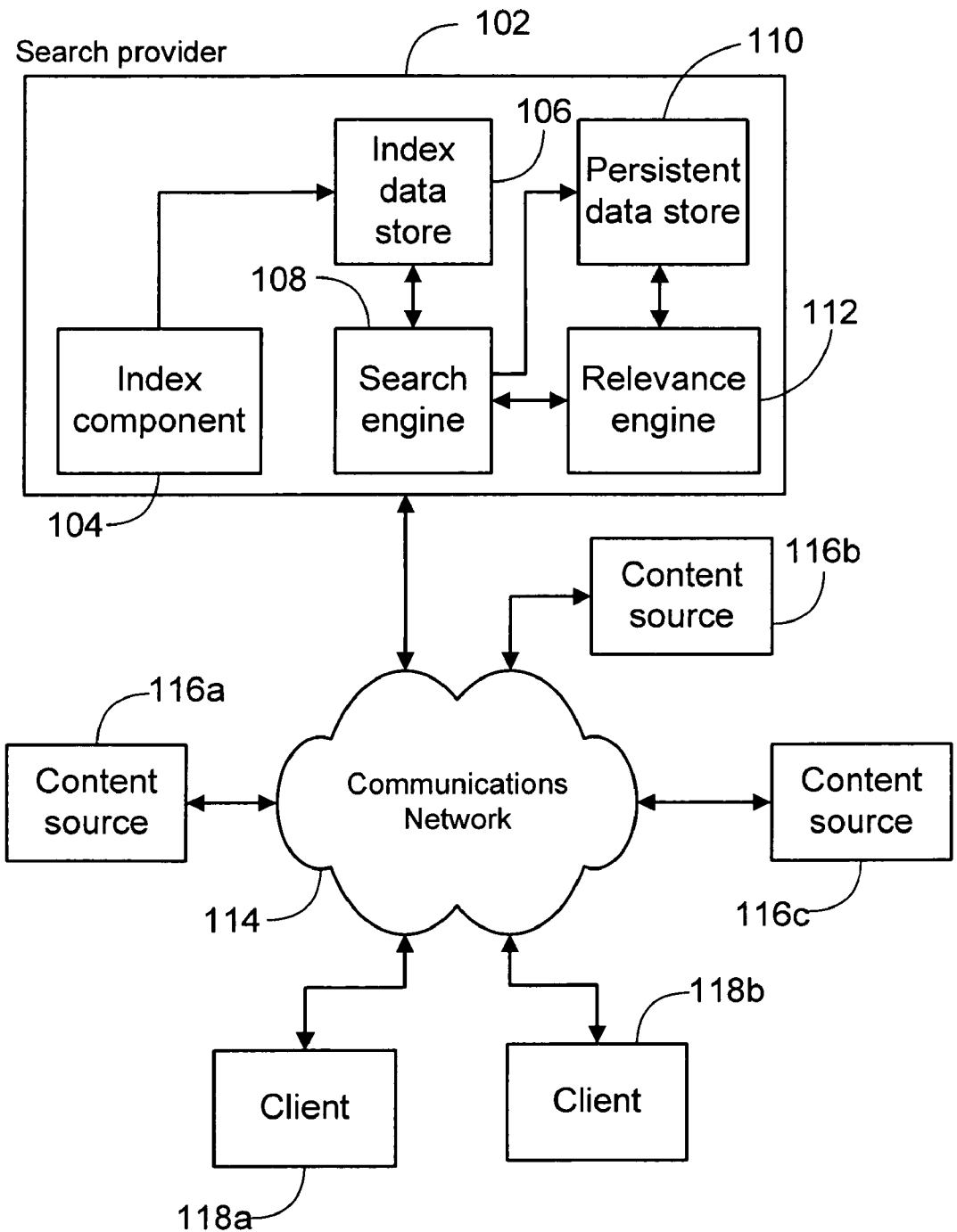
FIG. 1 is a block diagram presenting a system for generating and applying a relevance score trained with query differentiation according to one embodiment of the present invention.
Figure 2:
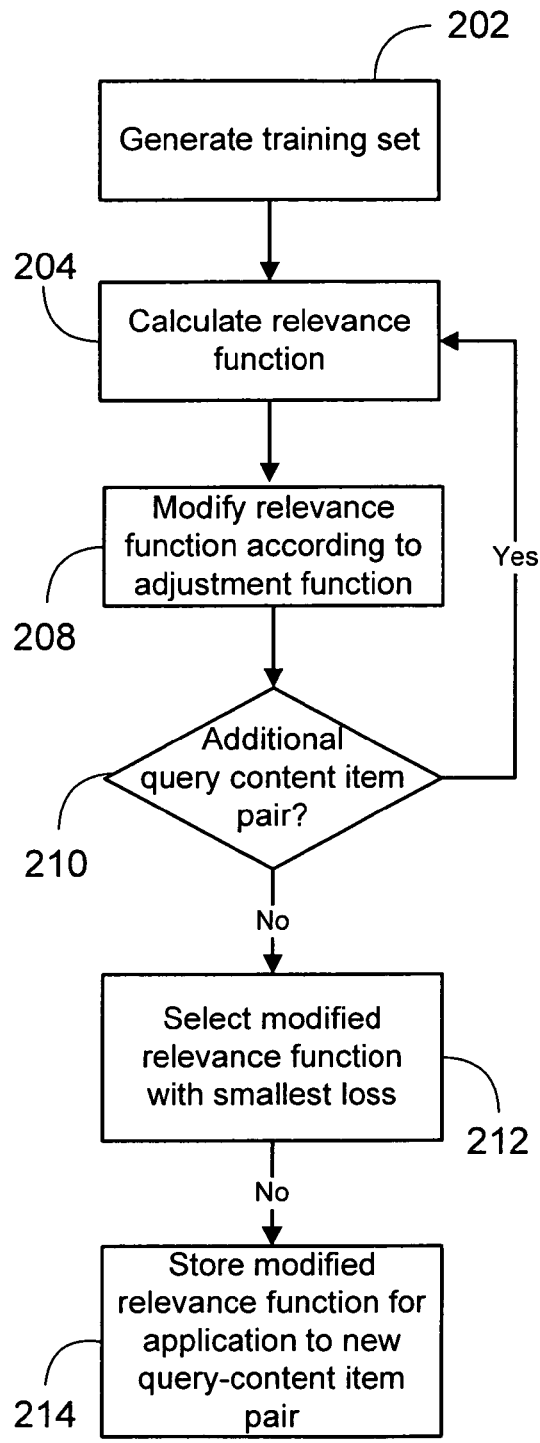
FIG. 2 is a flow diagram illustrating a method for selecting a relevance function that accounts for query differentiation in determining a relevance score according to one embodiment of the present invention.
Figure 3:
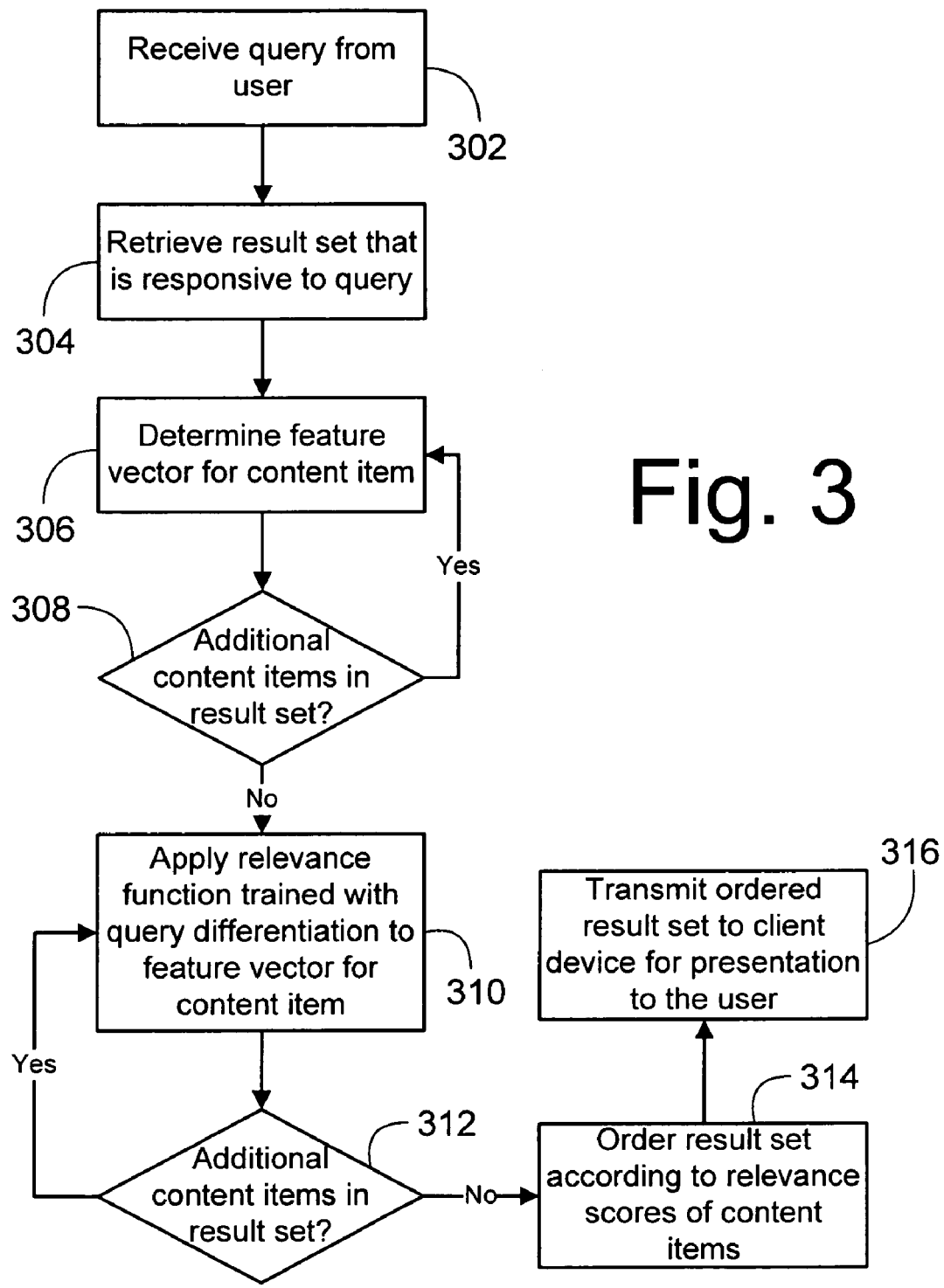
FIG. 3 is a flow diagram illustrating a method for ranking content items according to one embodiment of the present invention.

Embodiments of a method, system, and article of manufacture comprising software programs for utilizing query differentiation to determine retrieval functions for information retrieval systems in accordance with the present invention are described herein with reference to the drawings in FIGS. 1 through 3.

Turning to FIG. 1, a system comprising hardware and software components configured according to one embodiment of the present invention is illustrated. According to the embodiment of FIG. 1, a search provider 102 comprises one or more software and hardware components to facilitate the identification of content items responsive to a query and calculate the relevance of the content items to the query, which may be used for ranking purposes. The hardware and software components include, but are not limited to, an index component 104, a search engine 108 and a relevance engine 112. The search provider 102 also comprises one or more data stores for providing persistent storage of information used in searching and calculating relevance values for content items including, but not limited to, an index data store 106 and a persistent data store 110. Those of skill in the art should note that although the embodiment of FIG. 1 illustrates information retrieval in the context of a search engine, the systems and methods of the present invention are generally applicable to information retrieval tasks.

The search provider 102 is communicatively coupled with a network 114, which may include a connection to one or more local and wide area networks, such as the Internet and may provide access to linked networks of content items, e.g., the World Wide Web. Using the network 114, the search provider 102 is capable of accessing content sources 116a, 116b and 116c that host content items a user may wish to locate through use of the search engine 108 at the search provider 102. The search provider 102 may communicate with one or more content sources 116a, 116b and 116c for maintaining cached copies at the persistent data store of content items that the content sources 116a, 116b and 116c host. The collection of items content items, as well as information regarding content items, is referred to as "crawling", and is the process by which the search provider 102 collects information upon which the search engine 108 performs searches. Exemplary methods for crawling information on a network is described in commonly owned U.S. Pat. No. 6,021,409, entitled "METHOD FOR PARSING, INDEXING AND SEARCHING WORLD-WIDE-WEB PAGES," the disclosure of which is hereby incorporated by reference in its entirety.

The search provider 102 crawls content sources 116a, 116b and 116c in communication with the network 114, such as the Internet, which may comprise collecting combinations of content items and information regarding the same. An index component 104 parses and indexes the content items and related information that the search provider 102 collects through the crawling process. The index component 104 generates an index that defines a structure for the content items and related information that allows for location and retrieval of the content items and related information. According to one embodiment of the invention, the index component 104 creates an index of word-location pairs that allows a search engine 108 to identify specific content items and information regarding the same in response to a query, which may be from a user, software component, automated process, etc. Exemplary methods for indexing information is described in commonly owned U.S. patent application No. 5,745,889, entitled "METHOD FOR PARSING INFORMATION OF DATABASE RECORDS USING WORD-LOCATION PAIRS AND METAWORD-LOCATION PAIRS," the disclosure of which is hereby incorporated by reference in its entirety. The one or more indexes that the index component 104 generates are written to an index data store 106 for persistent storage and use by other components of the search provider 102.

A user of a client device 118a and 118b who desires to retrieve a content item from a content source 116a, 116b and 116c that is relevant to a particular topic, but who is unsure or ignorant regarding the address or location of the content item, submits a query to the search engine 108. According to one embodiment, a user utilizes a client device 118a and 118b to connect over the network 114 to the search engine 108 at the search provider 102 and provide a query. A typical query has one or more terms. For example, the query "2005 Lincoln continental" contains three terms and is referred to as a three-term query. Similarly, queries containing only one term are referred to as one-term queries, queries containing two terms are two-term queries, etc. A space or other delimiter character that the search engine 108 comprehends delimits individual terms comprising a query.

According to one embodiment of the invention, a client device 118a and 118b is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, etc. The client device 118a and 118b typically run software applications (such as a web browser) that provide for transmission of queries to the search provider 102, as well as receipt and display of result sets responsive to the queries.

Upon receipt of the query, the search engine 108 examines the index using the terms comprising the query in an attempt to identify a result set that contains those content items that are responsive to the query. The search engine 108 formulates the result set for transmission over the network 114 for presentation to the user through use of the client device 118a and 118b. Where the result set comprises link to content items, the user may select a link in the result set to navigate to the content source that is hosting the content item that the link identifies. The search engine 108 utilizes a persistent data store 110 for storage of an historical log of the queries that users submit, which may include an indication of the selection of items in results sets that the search engine 108 transmits to users.

As discussed previously, users become increasingly frustrated when presented with a result set that does not identify content items are more relevant to a given query prior to less relevant items. Accordingly, the present embodiment provides a relevance engine 112 that is operative to utilize machine learning that is trained by query differentiation to determine the relevance of a given content item to a given query. The relevance engine 112 receives pairs of queries and content items, applying a relevance function, the selection of which is described in greater detail herein, to determine the relevance of the content item to the query.

The relevance engine 112 utilizes "features" of a given query-content item pair in determining relevance. A feature is a quantification of an aspect of a relationship between a query and content item, which may include quantifying aspects of the query, the content item, or both. According to one embodiment, a feature is represented as one or more values for a given query, a content item or both, and is referred to as a feature vector. Features that represent a value based only on a content item itself, which may include information regarding the content item, are referred to as query-independent features. In addition to depending on properties of the content item itself, query-independent features may depend on properties of the content source 116a, 116b and 116c hosting the content item, properties of the relationship of the content source 116a, 116b and 116c hosting the content item to other content sources in communication with the network 114, etc. Features that depend on a content item and a query are referred to as query-dependent features. Examples of specific query-independent and query dependent features of a query-content item pair are described in patent application Ser. No. 10/424,170 entitled "METHOD AND APPARATUS FOR MACHINE LEARNING A DOCUMENT RELEVANCE FUNCTION," and previously incorporated by reference herein in its entirety.

A training set forms the basis for determining a relevance function that the relevance engine utilizes to determine the relevance of a content item to a given query. The relevance engine 112 receives a training query and a set of content items for inclusion in the training set, which the relevance engine 112 may select. According to one embodiment, the relevance engine 112 presents content items from the training set to one or more human subjects for the assignment of training relevance scores indicating the relevance of content items in the training set to the query. Alternatively, the relevance engine 112 may access the persistent data store 110 to retrieve a past query (training query) and corresponding result set (training set), utilizing selection information from a user regarding the selection of items in the result set in response to the query to determine training relevance scores for the content items in the training set. On the basis of the training relevance scores, content items in the training set and the training query, the relevance engine 112 is operative to identify a relevance function, which the relevance engine 112 applies to determine the relevance of a content item to a new query that the search engine 108 receives.

In addition to determining a relevance function that allows for the determination of the relevance of a given content item to a query, the relevance engine 112 applies a relevance score adjustment function that accounts for a query difference adjustment. Applying the relevance score adjustment function improves selection of the function that the relevance engine 112 uses to assign a relevance scores to a content item relative to a given query. According to one embodiment, the relevance score adjustment function is a linear function. Alternatively, the relevance score adjustment function is a non-linear function. A loss function may determine the difference over the content items in the training set between a training relevance value assigned by a human (which as discussed may be determined by the other methods that reflect the human perception regarding the relevance of a given query-content item pair, e.g., say click-through information from the persistent data store 110 used by the relevance engine 112) and the output of the relevance score adjustment function, which receives a given relevance function as an input. Accordingly, when the relevance engine 112 applies the relevance function trained with a relevance score adjustment function that accounts for query differentiation to a new content item, the relevance engine 112 may determine the relevance of the content item to a query that the search engine 108 is processing.

The relevance engine 112 produces relevance scores that account for query differentiation, which allows query-content item pairs with different feature vectors to map to the same relevance scores. When the search engine 108 receives a query from a client device 118a and 118b that the user is utilizing, the search engine 108 queries the index in the index data store 106 to determine a result set that is responsive to the query. The search engine 108 may also pass the query and result set to the relevance engine 112. The relevance engine 112 applies the relevance function that has been trained with query differentiation to the one or more content items that it receives from the search engine 108, calculating a relevance score for the content items in the result set. The search engine 108 receives the relevance scores for the content items in the result set from the relevance engine 112 and may utilize the relevance scores for ranking or ordering purposes, e.g., presenting the content items or links to content items with the highest relevance scores (more relevant) prior to the content items or links to content items in the result set with lesser relevance scores (less relevant). The search engine 108 transmits the ranked result set to the client device 118a and 118b for viewing by the user.

As discussed above, the relevance engine employs a loss function to determine the relevance of a content item to a given query. FIG. 2 presents a flow diagram illustrating one embodiment of a method for selecting a relevance function that accounts for query differentiation in determining a relevance score. In order to better understand the selection of such a relevance function, it is useful to formulate the learning problem under consideration. According to the present formulation, D represents the set of all content items under consideration, L the set of training relevance scores, which may be a finite or infinite set, and Q, the set of all potential queries. Each query, $p \in Q$, may be modeled as a probabilistic distribution over D×L as presented in $$P_q(d,l), d \in D, l \in L \qquad \text{Equation 1}$$

Equation 1 specifies the probability that content item d is assigned training relevance score l when paired with query q. This probabilistic setting also includes the case where there is a deterministic function such as is presented in Equation 2:

$$f_q : D \mapsto L \qquad \text{Equation 2}$$

which specifies the training relevance score $f_q(d)$ for each content item.

A loss function L is specified over the set L×L, $$L : L \times L \mapsto R_+^1,$$

which encompasses the set of nonnegative real numbers, as well as a class of functions, H, where $$h \in H, h : D \mapsto L. \qquad \text{Equation 3}$$

For each query q, the relevance engine may then specify a learning problem such that $$h = \arg\min_{h \in H} \varepsilon_{P_q} L(l, h(d)), \qquad \text{Equation 4}$$

where the expectation is with respect to the distribution $P_q$ corresponding to the query q. By directly considering the problem of learning a relevance function, a loss function L may be determined that measures the difference between two raking functions such that the relevance engine is operative to solve for the optimization $$\min_{R \in R} \varepsilon_{P_Q} L(R_q, R). \qquad \text{Equation 5}$$

The determination of a relevance function is predicated on the generation of a training set, step 202. The relevance engine selects or is provided with a training set of queries and, for each query q, a set of content items for relevance scoring D such that $$\{d_{qj}, l_{qj}\}, q=1, \ldots, Q, j=1, \ldots, n_q$$

where $l_{qj} \in L$ are training relevance scores, e.g., which may be obtained from human candidates to evaluate the relevance of a content item to a query. According to one embodiment, the sampling of the queries should be according to $P_Q$ and the sampling of content items for each query q should be according to $P_q$. The resultant training set therefore takes the form $$\{x_{qj}, y_{qj}\}, q=1, \ldots, Q, j=1, \ldots, n_q$$

where $x_{qj}$ is a feature vector representing the pair of a query q and content item $d_{qj}$, $q=1, \ldots, Q$ and $j=1, \ldots, n_q$, where Q is the total number of queries and $n_q$ is the number of content items associated with query q. Furthermore, $y_{qj}$ represents the training relevance score of the query-content item pairs. According to one embodiment $y_{qj}$ takes the values of 0, 1, 2, 3, or 4 that correspond to the editorial grades of perfect, excellent, good, fair and bad, respectively.

The relevance engine calculates a relevance function F( ), step 204, which is learnt from mapping $x_{qj}$ to $y_{qj}$. The relevance function is one element in the calculation of a loss function to determine an optimal F( ). According to one embodiment, a loss function L for determining an optimal relevance function is as follows:

$$L(F) = \sum_{q=1}^{Q} \sum_{j=1}^{n_q} (y_{qj} - F(x_{qj}))^2 \qquad \text{Equation 6}$$

where the value of the loss function is the summation of the square of the difference between a training relevance score for the query-content item pair and the output of a relevance function F( ) for determining relevance on the basis of the feature vector $x_{qj}$. An optimal relevance function results in a smallest value for L, e.g., zero.

To account for query-dependent effects in selecting a relevance function, according to one embodiment the relevance engine calculates loss function as follows:

$$L(F, g) = \sum_{q=1}^{Q} \sum_{j=1}^{n_q} [y_{qj} - g_q(F(x_{qj}))]^2 \qquad \text{Equation 7}$$

where $g_q$ is a relevance score adjustment function for query q that accounts for query-dependent effects to the relevance calculation. According to one embodiment, $g_q( )$ is a monotone function where $g=[g_1, \ldots, g_Q]$ and the relevance engine solves for $$\{F^*, g^*\} = \arg\min_{\{F,g\}} L(F,g) \qquad \text{Equation 8}$$

Consider the simple case where $g_q( )$ is a linear function, e.g., $$g_q(x) = \alpha_q + \beta_q x \qquad \text{Equation 9}$$

According to one embodiment, the relevance engine may add penalty terms to the loss function to control the size of the parameters of the function. Accordingly, the loss function that the relevance engine uses in determining F(x) may be expressed as $$L(F, \alpha, \beta) = \qquad \text{Equation 10}$$
$$\sum_{q=1}^{Q} \sum_{j=1}^{n_q} [y_{qj} - \alpha_q - \beta_q F(x_{qj})]^2 + \lambda_\alpha \|\alpha\|_p^p + \lambda_\beta \|\beta\|_p^p$$

where $\alpha = [\alpha_1, \ldots, \alpha_Q]$ and $\beta = [\beta_1, \ldots, \beta_Q]$, $\beta_\alpha > 0$, $\lambda_\beta$ are regularization parameters, and $\|\cdot\|_p$ is the p norm of a given vector.

One technique by which the relevance engine may solve the optimization problem discussed previously is though the use of coordinate descent, alternating between the optimization against F and ($\alpha$, $\beta$). Consider the case where p=2. For a fixed F, the components $\alpha_q$ and $\beta_q$ of $\alpha$ and $\beta$ may be identified by solving the following least squares problem:

$$\min_{\{\alpha_q,\beta_q\}} \sum_{j=1}^{n_q} (y_{qj} - \alpha_q - \beta_q F(x_{qj}))^2 + \lambda_\alpha \alpha_q^2 + \lambda_\beta (\beta_q - 1)^2 \qquad \text{Equation 11}$$

To force the nonnegativity on $\beta_q$ the relevance engine control the size of $\hat{\beta}_q = \beta_q - 1$. Furthermore, let the data matrix for query q and the response be a follows:

$$X_q = \begin{bmatrix} 1 & h(x_{q1}) \\ 1 & h(x_{q2}) \\ \vdots & \vdots \\ 1 & h(x_q, n_q) \end{bmatrix} \in R^{n_q \times 2}, \hat{y}_q = \begin{bmatrix} y_{q1} - h(x_{q1}) \\ y_{q2} - h(x_{q2}) \\ \vdots \\ y_{n_q} - h(x_{qn}) \end{bmatrix} \qquad \text{Equation 12}$$

The optimal $\alpha_q$ and $\beta_q$ for the relevance score adjustment function may be obtained by solving the following normal equation:

$$\left(X_q^T X_q + \begin{bmatrix} \lambda_\beta & 0 \\ 0 & \lambda_\alpha \end{bmatrix}\right)\begin{bmatrix} \beta_q \\ \hat{\alpha}_q \end{bmatrix} = X_q^T \hat{y}_q \qquad \text{Equation 13}$$

According to another embodiment, the relevance engine may utilize nonlinear regression for fixed $\alpha$ and $\beta$ to fit modified residuals:

$$[y_{qj} - \alpha_q - \beta_q F(x_{qj})], q=1, \ldots, Q, j=1, \ldots, n_q \qquad \text{Equation 14}$$

The relevance engine determines the relevance function according to the relevance score adjustment function as expressed by the loss function and a check is performed to determine if addition query-content item pairs exist in the training set for analysis, step 210. Where additional pairs exist, processing returns to step 204 with the calculation of a subsequent relevance function. Where no additional pairs exist, step 210, the relevance engine selects a relevance function that results the smallest possible lost over all query-content items pairs in the training set, step 212. The relevance engine stores the selected relevance function for use in determining the relevance of a query-content item pair not contained in the training set, step 214.

The relevance function selected according to the method of FIG. 2 allows for the determination of a relevance function trained with query differentiation. FIG. 3 presents one embodiment of a method for using the selected relevance function to order a result set that the search engine deems responsive to a given query. A user submits a query to the search engine, step 302, which causes the search engine to retrieve a set of content items that are to be ranked according to the relevance of the content items to the query, step 304. In some embodiments, only content items including or associated with one or more terms in the query are included in the result set, e.g., that contain user supplied tags that contain the terms. Alternatively, or in conjunction with the foregoing, the search engine may utilize other criteria to select content items for inclusion in the result set.

For a given content item, one or more values of a selected set of one or more features are evaluated for the content item as paired with the query, step 306. According to one embodiment, the relevance engine evaluates the set of features, which may be one or more features. The set of features that are selected may be made in advance of the evaluation, e.g., by a system administrator identifying the features for inclusion, or may be made at the time of the evaluation. A check is performed to determine if additional content items exist in the result set that require the determination of feature vectors, step 308. Processing continues until the selected set of features are determine vis-á-vis each content item in the result set, steps 306 and 308.

The relevance function that has been trained to account for query differentiation is used to determine a relevance score for a content item as paired with the query, step 310. The relevance function receives a feature vector for a given content item as input and provides a relevance score. A check is performed to determine if additional content items exist to which the relevance function is to be applied, step 312. Processing continues until a relevance score has been calculated for the content items in the result set, steps 306 and 308. The search engine orders the result set according to the relevance score associated with the content items in the result set, step 314. According to one embodiment of the invention, the result set is ordered according to decreasing relevance, e.g., the content items with the highest relevance score is presented first, etc. Thus, the content items that appears first in the ordered result set has the numerically greatest relevance score in the result set and the content item appearing last in the ordered result set has the numerically least relevance score. The search engine transmits the ordered result set to the client device for presentation to the user, step 316.

The foregoing description, for purposes of explanation, uses specific nomenclature and formula to provide a thorough understanding of the invention. It should be apparent to those of skill in the art that the specific details are not required in order to practice the invention. The embodiment have been chosen and described to best explain the principles of the invention and its practical application, thereby enabling others of skill in the art to utilize the invention and various embodiments with various modifications as are suited to the particular use contemplated. Thus, the foregoing disclosure is not intended to be exhaustive or to limit the invention to the precise forms disclosed and those of skill in the art recognize that many modifications and variations are possible in view of the above teachings.

What is claimed is:

1. A method for selecting a relevance function to determine a relevance of a query-content item pair, the method comprising:
    generating a training set comprising one or more content item-query pairs;
    determining, by a processor, a relevance function for each query-content item pair;
    modifying the relevance function using a loss function according to a relevance score adjustment function that accounts for query differentiation, wherein an output for the relevance score adjustment function receives the determined relevance function as input, wherein the query differentiation is a difference between a training relevance value and the output of the relevance score adjustment function, and wherein the loss function L for determining an optimal relevance function F is $$L(F, \alpha, \beta) = \sum_{q=1}^{Q} \sum_{j=1}^{n_q} [y_{qj} - \alpha_q - \beta_q F(x_{qj})]^2 + \lambda_\alpha \|\alpha\|_p^p + \lambda_\beta \|\beta\|_p^p,$$

wherein $\alpha=[\alpha_1, \ldots, \alpha_Q]$ and $\beta=[\alpha\beta_1, \ldots, \beta_Q]$, Q being a total number of queries, and $\beta_\alpha > 0$, $\lambda_\beta$ are regularization parameters, $x_{qj}$ is a feature vector with query q, $y_{qj}$ is the training relevance value of the query-content item pair, $n_q$ is a number of content items associated with query q, and $\|\cdot\|_p$ is the p norm of a given vector; and selecting a relevance function trained with query differentiation that produces a smallest loss, wherein the relevance function trained with query differentiation is selected when the modified relevance function and the training relevance value converge.

2. The method of claim 1, wherein the using of the loss function comprises modifying the relevance function according to a linear relevance score adjustment function.

3. The method of claim 1, wherein the using of the loss function comprises modifying the relevance function according to a non-linear relevance score adjustment function.

4. The method of claim 1, wherein the using of the loss function comprises using a loss function selected from a set of loss functions consisting of a least mean square loss function, a query pairwise loss function and a loss function that compares a desired ranking order with an output ranking order.

5. The method of claim 1, wherein the using of the loss function comprises utilizing query descent to select the relevance function trained with query differentiation.

6. The method of claim 1, wherein the using of the loss function comprises modifying the loss function according to the query differentiations.

7. The method of claim 1, comprising utilizing one or more regularization parameters to control parameters of the relevance score adjustment function.

8. The method of claim 1, wherein the generating of the training set comprises selecting a relevance score for one or more query-content item pairs in the training set.

9. The method of claim 1, wherein the generating of the training set comprises selecting query dependent features for a given query-content item pair.

10. The method of claim 1, wherein the generating of the training set comprises selecting query independent features for a given query-content item pair.

11. The method of claim 1, wherein the generating of the training set comprises providing a given query-content item pair to a human judge to determine training a relevance score.

12. The method of claim 11, wherein the generating of the training set comprises generating a training relevance score on the basis of historical clickthrough data for the given query-content item pair.

13. The method of claim 11, wherein the generating of the training set comprises generating a training relevance score for the given query-content item pair based on information collected from the training set including web clickthrough data, bookmark data, and user input data using a client application.

14. The method of claim 1, comprising storing the relevance function trained with the query differentiation for the client application to a new query-content item pair.

15. The method of claim 14, comprising applying the relevance function trained with the query differentiation to a new content item in response to receipt of a query from a user.

16. The method of claim 15, comprising:
retrieving one or more content items in a result set in response to the receipt of the query from the user;
determining a feature vector for the given content item in the result set;
applying the relevance function trained with the query differentiation to the feature vector for the given content item; and
generating a relevance score for the given content item.

17. The method of claim 16, comprising ordering the given content item in the result set according to the relevance score for the given content item.

18. The method of claim 17, comprising transmitting the result set to the user.

19. A method for selecting a relevance function to determine a relevance of a query-content item pair, the method comprising:
generating a training set comprising one or more content item-query pairs;
determining, by a processor, a relevance function for each query-content item pair,
using a loss function to train the relevance function according to a relevance score adjustment function that accounts for query differentiation, the loss function operative to determine a difference between a training relevance value assigned by a human and an output of the relevance score adjustment function by modification of the relevance function through non-linear regression and optimization of the relevance score adjustment function by regularization until convergence, and wherein the loss function L for determining an optimal relevance function F is $$L(F, \alpha, \beta) = \sum_{q=1}^{Q} \sum_{j=1}^{n_q} [y_{qj} - \alpha_q - \beta_q F(x_{qj})]^2 + \lambda_\alpha \|\alpha\|_p^p + \lambda_\beta \|\beta\|_p^p,$$

wherein $\alpha=[\alpha_1, \ldots, \alpha_Q]$ and $\beta=[\alpha\beta_1, \ldots, \beta_Q]$, Q being a total number of queries, and $\beta_\alpha > 0$, $\lambda_\beta$ are regularization parameters, $x_{qj}$ is a feature vector with query q, $y_{qj}$ is the training relevance value of the query-content item pair, $n_q$ is a number of content items associated with query q, and $\|\cdot\|_p$ is the p norm of a given vector; and
selecting a relevance function trained with the query differentiation that produces a smallest loss.

* * * * *